April 28, 1936.  J. S. NAERY  2,039,105
METHOD OF MAKING REFERENCE APPARATUS FOR SHEET METAL PARTS
Filed April 30, 1934  2 Sheets-Sheet 1
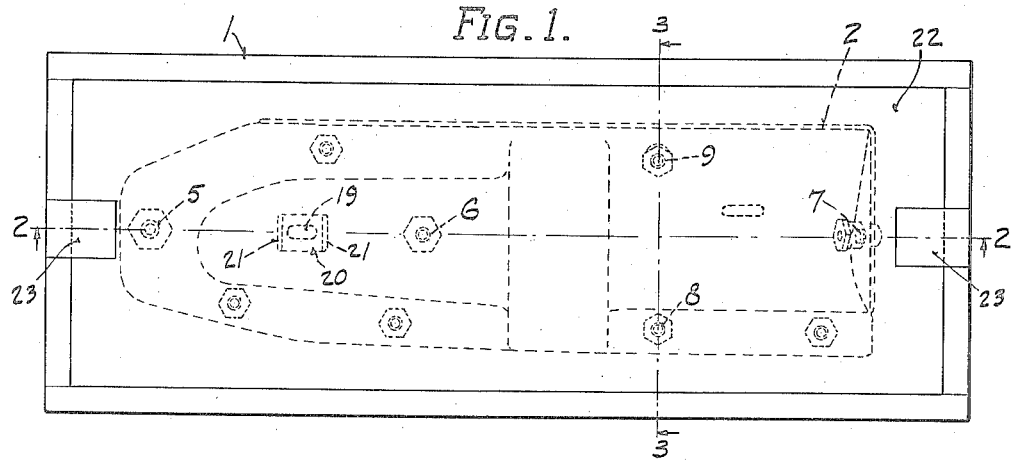
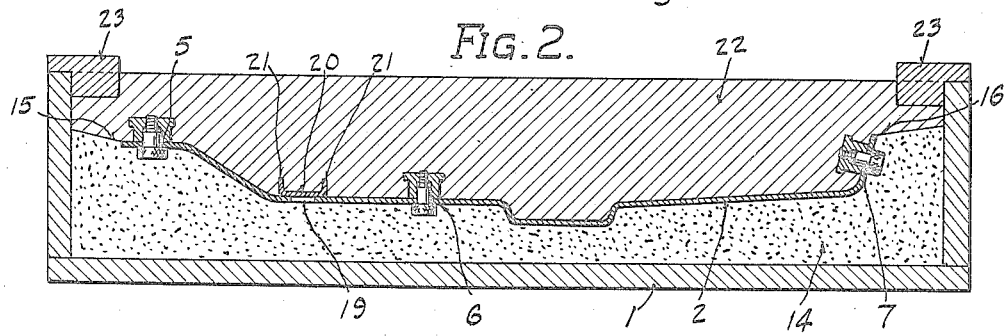
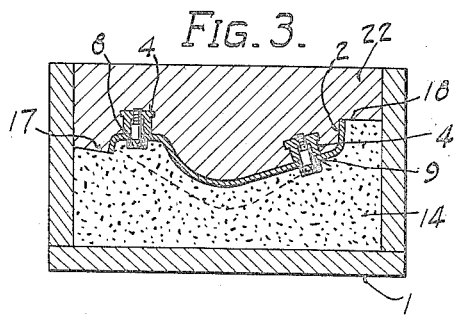
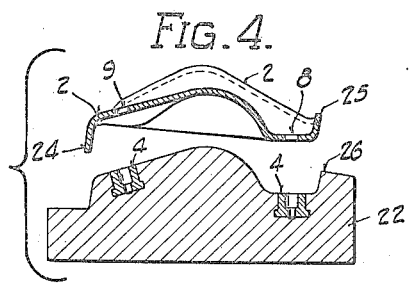
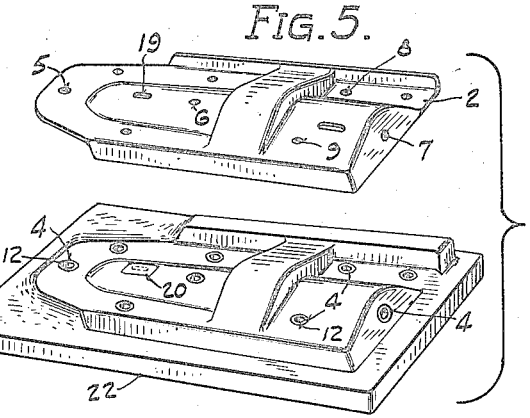
INVENTOR.
John S. Naery
BY
ATTORNEY.

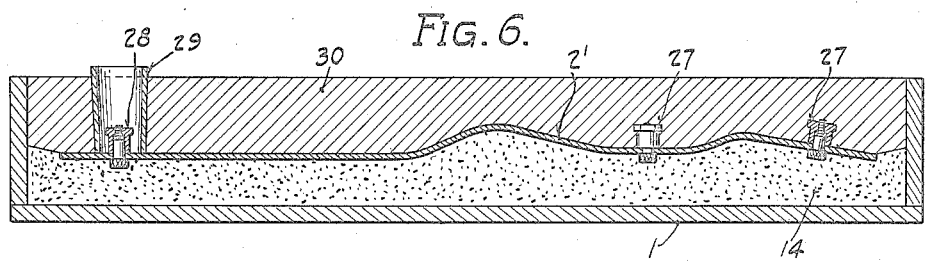
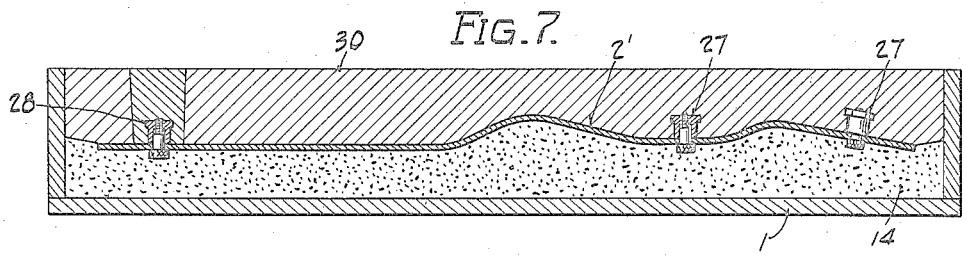
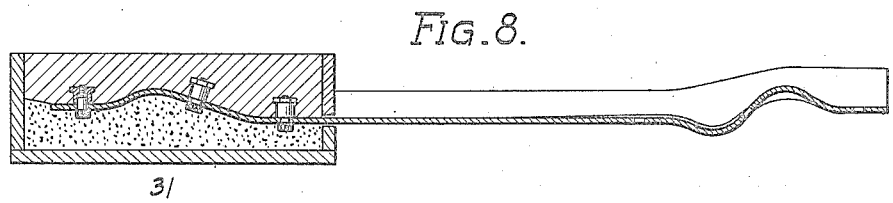
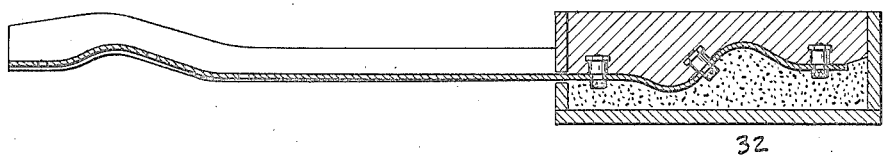
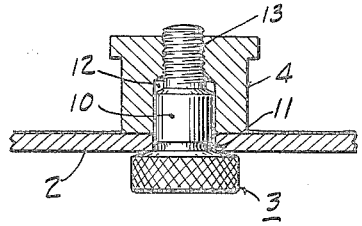
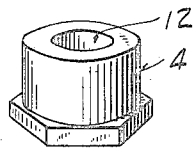
INVENTOR.
John S. Naery Patented Apr. 28, 1936

2,039,105

UNITED STATES PATENT OFFICE 2,039,105

METHOD OF MAKING REFERENCE APPARATUS FOR SHEET METAL PARTS

John S. Naery, Shorewood, Wis., assignor to A. O. Smith Corporation, Milwaukee, Wis., a corporation of New York Application April 30, 1934, Serial No. 723,137

5 Claims. (Cl. 18—55)

This invention aims to provide simple and efficient apparatus by means of which the manufacture of sheet metal parts may be adjusted to obtain the desired configuration of such parts, and to further provide a method of making said apparatus.

The invention more specifically applies to the manufacture of pressed or drawn sheet metal parts such as are employed in the construction of automobile frames and the like. Further objects will be apparent from the accompanying description and the attached drawings which illustrate embodiments of the invention.

Figure 1 is a top plan view of such an apparatus at one stage during its process of manufacture.

Fig. 2 is a longitudinal section of the apparatus taken on line 2—2 of Fig. 1.

Fig. 3 is a transverse section taken on the line 3—3 of Fig. 1.

Fig. 4 is a section similar to Fig. 3 showing the finished apparatus with the parts thereof in separated relation.

Fig. 5 is a perspective view of the apparatus shown in Fig. 4.

Figs. 6 and 7 are longitudinal sectional views showing a modification of the invention.

Figs. 8 and 9 are longitudinal sectional views showing a further modification of the invention.

Fig. 10 is an enlarged sectional view of a detail shown in Figs. 2 and 3.

Fig. 11 is a perspective view of an element shown in Fig. 10.

In the manufacture in large quantities of drawn sheet metal parts such as are used in the construction of automobile frames, considerable difficulty has been experienced in the production and maintenance of the desired accuracy of the dimensions of such parts.

In such manufacture, drawings are made of the sheet metal part to be constructed. Frequently a hand-hammered sample is then made to check the desirability of manufacturing the part as represented in the drawings and further to determine its relationship to other parts with which it is to be assembled. If changes are found desirable, these are then incorporated in the drawings. At this stage, tools are built for blanking, piercing holes in, and drawing the sheet metal part to shape. These tools are then placed in presses and employed in producing such an article from a sheet of metal.

The article thus produced is then checked against such dimensions as the drawings have disclosed and also against the original hand-hammered sample which has been found acceptable. If the article is not then completely satisfactory, the necessary changes are made upon the manufacturing tools until a completely satisfactory article is produced.

During the manufacture of succeeding articles, much difficulty has been experienced in assuring that they are all identical in dimension and contour to one found to be correct. This is due to many causes, such, for instance, as slight variations in the gauge of the material used, variations in hardness of succeeding batches of the sheet metal material used which causes greater or less spring back after the pressing operation and due to wear of the drawing or pressing tools. Further, it is necessary at various times to reset the tools in presses to make added quantities of the article, and said tools have to be adjusted at such time to insure that the same dimensions in the pressed metal article are secured as in the original satisfactory one.

In each case, as above outlined, much time has been consumed in making the necessary comparisons with the drawings and the original article to obtain the desired result.

In the present invention a comparison apparatus has been devised and a method of making the same which completely obviates the above difficulties in making the needed comparisons and in the adjustment of the tools to secure the desired article.

Referring particularly to Figures 1, 2, and 3, 1 is a box which may be employed in the construction of the comparison apparatus. Article 2 is a sheet metal part which has been produced by forming tools and found to be acceptable. Article 2 is shown with a number of round pierced holes extending therethrough. In these holes there are inserted from the under side of the article dowel pins 3 which are screwed into buttons 4 located upon the upper side of the article.

These assemblies are shown in all round holes including the holes 5, 6, 7, 8, and 9.

The dowel pin and button are best illustrated in assembled relation in Fig. 10. As shown in this figure, pin 3 has a dowel body 10 machined to fit closely in hole 11 of the article. Button 4 is provided with a cylindrical bore 12 which fits closely to dowel body 10 and thus has the same diameter as hole 11. Button 4 is secured tightly against the article by means of screw 13 on dowel pin 3.

After securing buttons 4 to the article at the round holes as described, this article is placed in the box 1 and embedded in sand or other suitable material 14. The upper surface of the sand is then carefully smoothed off from the edge positions of the article, as illustrated at points 15 and 16 of Fig. 2 and points 17 and 18 of Fig. 3.

Pierced holes of special shape are shown extending through the article, one of which holes 19 is illustrative. A smooth metal plate 20, with anchoring prongs 21 extending away from the article, is placed over such special shaped hole. The space above the article 2 in box 1 is then filled with a moulding composition 22 which fills the contour of the article and the sand mould. This material is struck off level with the top of the box. The moulding composition preferred is a thin mix mainly of plaster of Paris and water which is so compounded as not to shrink upon setting. However, other materials may be employed such as low melting point metals.

Blocks 23 are inserted at the time of pouring to provide hand holes for the convenient handling of the hardened composition block 22 in service.

It is desired to have a certain clearance provided between article 2 and block 22 after the completion of the latter. For this purpose the upper surface of the article is coated with a suitable material previous to the pouring of composition 22. The preferred material for this purpose is paraffine when plaster of Paris is used for the moulding material. The paraffine is heated and applied to the article with a brush. In case greater clearance between the article and the moulded block is desired, one or more additional coats of paraffine may be applied. The heat produced by the chemical action of the setting of the plaster of Paris loosens the paraffine from the article and causes it to adhere to the plaster of Paris block.

After the removal of this block from the box, the dowel pins 3 are unscrewed and the article thereby removed from the block after which the paraffine is melted from the surface of the block by means of a flame and the block later varnished or otherwise protected against absorption of moisture from the atmosphere.

Figures 4 and 5 illustrate the block 22 and the model article in position to be placed thereon. These parts in combination comprise a reference apparatus which is ready for use as such in the manufacture of similar metal articles. When model article 2 is placed upon its complementary block 22, the holes in the former can be caused to align accurately with the holes in buttons 4 embedded in said block. This can be determined either by visual observation or by the insertion of suitably dimensioned gauge pins through said holes in 2 into buttons 4. If it is desired to preserve the accurate location of the special shaped holes such as 19, a contour line may then be scribed on plate 20 to outline the contour of such hole.

The model article 2 is constantly retained with its complementary block 22 and the first thing that is done when said comparison apparatus is employed in the manufacture of such articles is to place these two parts in interfitting relation and compare the alignment of the holes and other dimensioned features. Such a comparison readily establishes the preserved accuracy of block 22 and insures that no injurious change has taken place in the same due to warpage or other cause. After this comparison is complete, a similar article, the accuracy of which is to be tested, is substituted for 2 and a similar comparison made.

The general contour is immediately checked by the fitting of the new piece upon the block 22. The clearance provided by the paraffine employed in the making of the apparatus allows for the permissible variation in form. It will be noted also that if during the drawing operation the blank has pulled or drawn too far toward one edge, such occurrence will be immediately apparent since block 22 is struck off laterally at the position of these edges and if as is evident by referring to Fig. 4, edge 24 extends too far, the article will not be permitted to fit down closely to block 22, and if edge 25 is too long, such condition will be immediately apparent since it will then project above the edge of block 22 at position 26. If then any hole in the article is found not to align properly with its corresponding dowel button hole or its scribed locating line, the amount and direction of such deviation can be immediately determined and the corresponding punch in the piercing tool moved to correct such fault.

The above-described apparatus is particularly useful in resetting the tools for the manufacture of any one of successive lots of such articles. After the tools are placed in operation, a sheet metal blank is submitted to the manufacturing operations by said tools, and the resulting article placed on block 22 after such block has been verified by means of model article 2. The needed changes in the setting or adjustment of the tools then become apparent and are readily made as before described, and a new article is then formed. This article is then placed upon block 22 and if found to be satisfactory, the tools are in condition for use in manufacture.

In certain cases several drawing or forming steps are necessary to produce the final article. In this case there are employed separate forming tools for each forming step. It has been found in such cases to be advantageous to have comparison apparatus of the type described constructed from the article as it exists at the completion of each of such forming steps. By this means the article may be treated at each step somewhat as a finished article, thereby greatly simplifying the adjustment and maintenance of accuracy throughout the manufacture. When this procedure is not followed, it often becomes necessary to hold up or suspend manufacture in all of the presses which contain tools for the making of the article during the period of adjustment and the production of an acceptable article. This causes large expense, due to the production loss on said group of presses.

In the construction of a comparison apparatus of the kind here disclosed, if the material used for the moulding of the complementary block changes dimension upon setting, or if low melting point metals are employed expanding somewhat the model metal article at the time of pouring such metals, trouble may be experienced due to relative change in the spacing between holes in the article as related to the spacing between the corresponding holes in the dowel buttons. This difficulty becomes greater the greater the distance between such holes.

Figures 6 and 7 are longitudinal sectional views of an elongated comparison apparatus during the process of its manufacture, showing a modification of the invention designed to overcome the above difficulty. An elongated article 9 is here shown at approximately the same stage in the operation of making the apparatus as is article 2 in Fig. 2. At the right of these figures are shown two dowel buttons 27 secured in alignment with holes in the article which are sufficiently close to each other not to give any trouble due to change in the relative distances between the holes in the article and in the buttons. These buttons are placed and moulded in the block in the manner described heretofore. At the left is shown a button 28 which is sufficiently removed from buttons 27 so that such trouble may occur. In Fig. 6 is shown a core 29 which is placed over the position of button 28 before the mould block 30 is poured. After said mould block has set, core 29 is removed and additional moulding material is poured around button 28 as shown in Fig. 7. This obviates any detrimental change in dimensions between the positions of buttons 27 and 28.

In the manufacture of pressed metal articles of considerable length, there may be a wind or similar deviation in the finished part from the ideal or model part. Upon assembly of such part with other parts, it may readily straighten out and thus be perfectly satisfactory. In the construction of comparison apparatus for use in the manufacture of such a metal article, I may divide such apparatus into two or more parts as illustrated in Figures 8 and 9. In this manner the part of the apparatus 31 in Fig. 8 is shown as being constructed for use in maintaining the accuracy at one end of the article and apparatus 32 shown in Fig. 9 for the other end. In this manner a wind that may occur in the bar will not prevent the manufactured article from fitting upon the separate parts of this apparatus. Apparatuses 31 and 32 may be extended to overlapping positions, so that a common hole may be checked from each part of such apparatus, thereby insuring continued accuracy of hole locations from end to end of the article.

The apparatus and methods herein described may be modified without departing from the spirit of the invention.

What I claim is:

1. The method of making a reference standard for use in the maintaining of accuracy in the manufacture of pressed metal articles with openings therethrough comprising the making of a model of the article, placing indicating means on said model and in indicating registry with said openings, embedding one face of said model in supporting material in a form with said indicating means extending in a direction away from said supporting material, placing a material capable of hardening to form a block in the remainder of said form and in contact with the surface of said model which block upon hardening has embedded in its face said indicating means, and subsequently removing said model to make said block available as a reference standard.

2. The method of making reference standard for use in maintaining accuracy in the manufacture of sheet metal parts with openings therein comprising arranging a model of the part to be manufactured in position to mould a complementarily fitting block against one face thereof, placing indicating means upon said face and in registry with said openings, moulding said block against said face to fit the same and embed said indicating means, and removing said model from said block.

3. The method of making reference standard for use in maintaining accuracy in the manufacture of sheet metal parts with openings therein comprising arranging a model of the part to be manufactured in position to mould a complementarily fitting block against one face thereof, placing indicating means upon said face and in registry with said openings, covering said face with a removable coating of material to produce clearance between said model and said complementary block, moulding said block to fit said spacing material on the face of said model and embed said indicating means, and finally removing said model and the spacing material from said block.

4. The method of making a reference standard for use in the manufacture of drawn sheet metal articles with openings therein comprising placing a model of the article in position for moulding a block against one face thereof in complementary relation, said model having indicating means attached thereto in indicating relation with an opening therethrough, placing a removable core piece over said indicating means, moulding said block against said face of the model and around said core, and removing said core and pouring additional moulding material in said core space and embedding said indicating means.

5. The method of making a reference standard for use in the maintaining of accuracy in the manufacture of pressed metal articles with openings therethrough comprising the making of a model of the article, placing and securing on said article indicating means with openings therein, said openings in said indicating means corresponding to and being fixed in registry with the openings in said article, supporting said model in a form with said indicating means extending from the upper surface, moulding a complementarily fitting block upon said model and embedding said indicating means, and removing said model from said block.

JOHN S. NAERY.